March 10, 1953  T. J. DOHERTY ET AL  2,631,274
ANNUNCIATOR FOR GAMES
Filed Nov. 14, 1949  2 SHEETS—SHEET 1
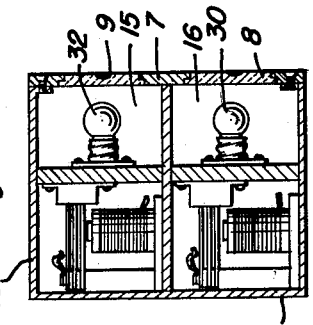
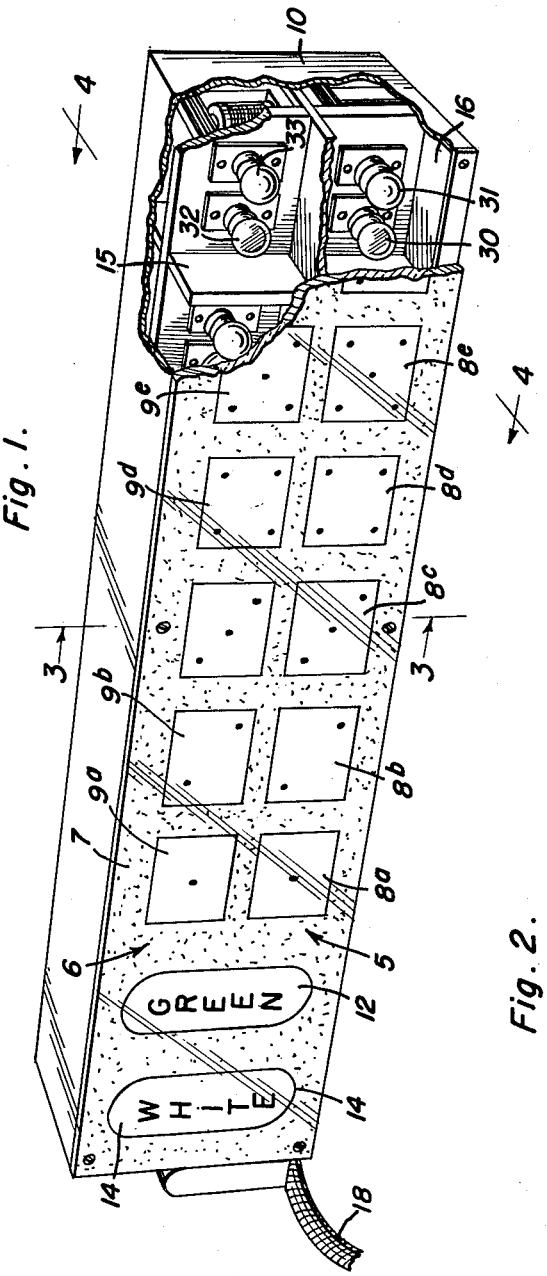
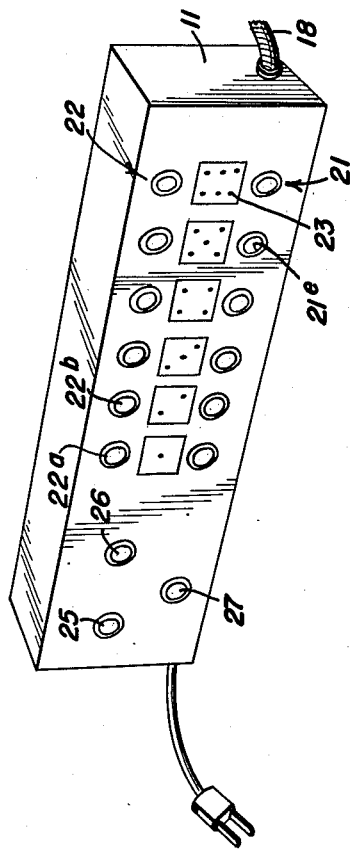
Thomas J. Doherty
Marion E. Curl
INVENTORS
BY March 10, 1953

T. J. DOHERTY ET AL 2,631,274

ANNUNCIATOR FOR GAMES

Filed Nov. 14, 1949

Thomas J. Doherty
Marion E. Curl
INVENTORS

BY *Clarence A. O'Brien*
*and Harvey B. Jacobson*
Attorneys

Patented Mar. 10, 1953

2,631,274

UNITED STATES PATENT OFFICE 2,631,274

ANNUNCIATOR FOR GAMES

Thomas J. Doherty and Marion E. Curl, Palm Beach, Fla., assignors to The Everglades Protective Syndicate, Inc., Palm Beach, Fla., a corporation of Florida Application November 14, 1949, Serial No. 127,036

7 Claims. (Cl. 340—323)

This invention relates to annunciators for games and more particularly to annunciators by means of which the progress of a game played by a plurality of parties may be indicated, and it has for its object to use a certain number of display means arranged on an annunciator board for the display of characters, numbers, figures, sets of dots or other markings scored by each party upon each step or in each phase of the game, while changing the manner of display for each party so that a large number of persons may follow the progress of the game on the same board by looking at the same display means.

A further object of the invention consists in providing an annunciator for games played by a plurality of parties in which the score or result obtained in each phase of the game is displayed on a display board provided with display windows, an additional display window being provided indicating the party and a display in this additional window being accompanied by a characteristic change of the manner of display in each of the other display windows, thus allowing a spectator to identify the party whose score is announced without difficulty.

A further object of the invention consists in providing a simple apparatus for displaying scores consisting of characters, figures, sets of dots, markings etc. so arranged that a plurality of indicia may be displayed simultaneously in different manners characteristic of the parties playing the game, further indicia or markings being provided displayed upon each change and the manner of display indicating the party whose score or result is displayed so that the score and the party obtaining the same are readily indentifiable.

A further object of the invention consists in apparatus of the above mentioned type provided with several rows or groups of display means, each row or group permitting to display one of the characters, figures, sets of dots, markings or other indicia corresponding to one move of a party and reproducing the elements of which the score is composed, the display means of all the several rows or groups being displayed simultaneously, in order to indicate or reproduce the result obtained, and in which apparatus the same groups or rows of display means are used for displaying the scores or results obtained by a plurality of parties, the individual party being identified by a characteristic method of displaying the character, figure, set of dots, etc., such as the color used, in conjunction with an additional display means describing or identifying the party.

A further object of the invention consists in providing operating means for a display annunciator apparatus of the type abovementioned which is operable by push buttons, each row or group of display means being operated by a corresponding row or group of push buttons and each individual display means being operated by a corresponding push button in the corresponding row, further selector and release buttons being provided, adapted to select the manner of display characteristic of the party, and an additional character, inscription, or the like announcing the party and its relation to the particular character of the display, such as color of the same.

A further object of the invention consists in providing a plurality of illuminating devices, each characterized by a special feature, such as the color of the display for each of the display means, and in further providing an additional display means indicating the party whose scoring is displayed, and further providing an electromagnetic means which, upon selection of a party by operating a selecting button, automatically shifts the connections so that display can only take place in a specific and characteristic manner in all the rows or groups of the display means until a further releasing button cancels or extinguishes the display.

A further object of the invention consists in providing an annunciator for games having a number of display windows arranged in a plurality of series, each display window corresponding to one character, figure, set of dots, etc., the said plurality of series permitting to display a number of display windows simultaneously, such display being made by illumination of the said display windows in different colors, each color corresponding to the selection of a party, while additional display windows indicate the party and associate said party with the manner of display, electromagnetic means being further provided for selecting the color of the illumination and the additional display window once a selection has been made and for connecting the illumination means in such a way that after a selection of a definite party all subsequent displays of characters, figures, or other indicia will automatically be made by the same type of illumination means which is connected with the party which has been selected.

Further and more specific objects will be apparent from the following detailed specification.

The invention is illustrated in the accompanying drawings showing one embodiment thereof by way of example. It is however, to be understood that the example shown was selected in order to explain the principle of the invention and the best mode of applying this principle. The invention is not confined to a particular annunciator or to a particular game or to a particular number of displays and it will therefore be clear that modifications of the specific example shown will not necessarily entail a departure from the principle of the invention.

In the drawings:

Figure 1 is a perspective view of the annunciator box when adapted to a game of backgammon or any other game played with dice and two parties.

Figure 2 is a perspective view of the control box to be used in connection with the annunciator shown in Figure 1.

Figure 3 is a diagram of the connections, showing diagrammatically the connections within the annunciator box and within the control box.

Figure 4 is a cross sectional elevational view of the annunciation box, the section being taken along line 4—4 of Figure 1.

The annunciator arrangement according to the present invention essentially consists in a display box 10 and in the control box 11 the latter containing the control means for operating the arrangement.

The display box 10 comprises a display panel 7 provided with display windows on which the characters, figures, sets of spots, indicia, etc., are displayed in such a manner that spectators may follow the game from a distance.

By way of example it has been assumed that the progress of a game of backgammon is displayed on the annunciator. As well known such a game is played by means of a pair of dice which are thrown simultaneously. The annunciator therefore displays the result of each shooting.

In view of the fact that in this case two dice are thrown simultaneously the display box contains two rows of display windows indicated at 5 and 6 respectively. Each row in this case consists of six windows indicated by the reference letters 8 and 9 provided with suitable alphabetical indicia $a, b, c, d, e, f$, respectively. The windows in this case reproduce the six faces of a die. The window pane of each window may be made of frosted glass or of translucent or transparent plastic on which the spots simulating the die face are painted or are formed by engraving, embossing or the like. Behind the panel the box 10 is divided into compartments (Figs. 1 and 4), and each compartment contains several means for illuminating the window pane which is to be displayed while the window panes which are not displayed remain inconspicuous on the dark background of a non-illuminated compartment.

In order to clearly distinguish the two parties which are playing a game of backgammon each party may be identified by the color with which the display windows are illuminated, say white and green.

Therefore in the example illustrated two kinds of illuminating display lamps are provided in each compartment 15 and 16 behind the window pane, each lamp emitting light of one of the two colors selected for identifying the parties. It will thus be clear that the lighting of a green lamp behind panel window 9b and 8e signifies that the player identified with the green color, when casting the dice, got a "2" and a "5."

The panel 7 in addition to the display windows already described has two further selector display windows 12, 14 which are covered with suitable window panes indicating which player obtained a score which is displayed in the other display windows. In the example illustrated the window pane which may consist of frosted or translucent glass or plastic may bear an inscription referring to the party or to the color with which the party is identified and in addition either the lamp illuminating the window pane or the window pane itself may have the color so designated.

The control box 11 is arranged for push button control and contains two rows of display control push buttons 21, 22 corresponding to the two rows of display windows 5 and 6 in the display box 10. An indicating plate or shield 23 may be associated with each pair of push buttons corresponding to the same die face and the plate or shield may be provided with the reproduction of the die face or with a number of spots carried by the die face.

In addition the control box contains the two selector buttons 25 and 26 which serve to select the color or other identification means used to identify the party and a releasing and restoring button 27 which serves to extinguish the lamps which may have been lighted and to restore the whole apparatus to its normal position. The control box is connected with the display box 10 by means of a multi-conductor cable 18.

The operating equipment of the display box which is controlled by the control box 11 comprises pairs of display lamps 30, 31 and 32, 33 respectively which are located behind each display window within one of the compartments 15, 16 of the box. The display lamps 30, 31, for instance, are contained in the lower compartments 16 and to distinguish them are provided with indicia $a, b, c, d, e, f$, corresponding to those of the display windows 8 in Figure 1, while display lamps 32, 33, provided with indicia in the manner above described, are located in the compartments 15 of the upper row 6 behind the display windows 9. Lamps 30 and 32, for instance, are all white while lamps 31, 33 are all green. It will therefore be clear that upon illumination of one of the lamps the picture of the die face will appear either on a white or on a green surface.

The display lamps are supplied with current by feed lines 34, 35 connected with the customary supply lines of the network indicated at 36 and 37. The circuits are controlled by relays in a manner to be described below. One of the supply lines 35 is connected with a bus conductor 69 leading to all the groups of lamps 30, 31 and 32, 33.

Each set of display lamps 30, 31 and 32, 33, respectively illuminating the same display windows 8 and 9 respectively, is controlled by a display lamp relay, the relays controlling the lamps 30, 31 being designated by the reference letter 40 followed by indicia $a, b, c, d, e, f$, corresponding to that of the display window lamps controlled by it, while the relays controlling the lamp set 32, 33 are designated by the reference 42 followed by the above named index. Each relay is provided with a holding armature 43, 44, respectively controlling a holding branch circuit and with two display lamp control armatures 45, 46 and 47, 49 respectively. These armatures move together as indicated by a dotted line joining them in the diagram. When therefore one of the relays 40 is energized a holding circuit 41 for the relay is closed at its armature 43 and simultaneously the lamps of a lamp set behind the display window are connected with bus conductors 48, 50 by the armatures 47, 49.

Each bus conductor 48, 50 is controlled by an armature 54, 55 of a selector relay 56, 58 respectively and each selector relay is also provided with a second armature 57, 59 which is a holding armature closing the holding circuit for the relay once it has been energized. The two armatures 55, 59 and 57, 54 of the relays 56, 58 operate conjointly and each relay, when energized, connects one of the bus bars 48, 50 with one of the supply wires 34. It will therefore be clear that upon energization of a selector relay one of the two bus conductors will be connected with the feed wire 34 while the lamp sets themselves are connected with a second feed wire 35 by means of the bus conductor 60.

The armatures 54, 55 of the selector relays 56, 58 also control the selector lamps 90, 91 illuminating the display windows 12, 14 which are therefore lighted when their corresponding relays are energized.

In addition to the set of relays above described a releasing and restoring relay 70 is provided the armature contacts 71 of which are normally closed but are opened by the energization of the relay 70. The armature 71 of the relay 70 controls the connection of the bus conductor 52 for all the display lamp control relays 40, 42 and for the selector relays 56, 58 with a transformer 80, supplied by the feed lines 34, 35, the secondary 81 of which supplies the energizing current for all the relays of the display box. A second bus conductor 51 is connected with the secondary 81 and this conductor feeds the relay holding circuits each of which is controlled by one of the relay armatures.

The bus conductor 51 is furthermore connected with one of the wire strands 61 of the multi-conductor cable 18 which leads to the bus conductor 63 of the control box 11 the function of which will be described below.

The releasing and restoring relay 70 is preferably also provided with a second armature 72 operated conjointly with the armature 71 which controls the operative circuit of a chime 84 the mallet or striker head 85 of which strikes against the tuned chime bars when the solenoid 87 is energized. The chime is therefore operated once whenever the releasing relay 70 is energized and when the circuit of the solenoid 87 is closed by the armature 72.

The control of the circuits is performed, as already described, by means of the push button switches 21, 22, 25, 26, 27 located in the control box. One of the contacts of each of the push button switches is connected with the bus conductor 63 which is joined to conductor 51 by cable strand 61. The second contact of each display control contact 21, 22 is moreover connected with one of the relays of the series 40, 42 of relays by means of conductors 65, 66, the individual conductors being provided with indices corresponding to those of the push button switches and of the display windows. The two selector push buttons 25, 26 control the lines 68, 67 respectively leading to the selector relays 58, 56 while the release button 27 controls the line 69 leading to the releasing and restoring relay 70.

The operation of the device will be readily understood from the foregoing description and may be briefly summarized as follows. Assuming that the apparatus is at rest and that the casting of the dice by the player identified with the green color resulted in the throwing of a "2" and a "5." The operator then first presses the selector button 26 corresponding to the green color identified with the player whose die casting should be displayed on the annunicator and he then presses the two display buttons 22b and 21e corresponding to the spots on the die face.

Upon pressing of the button 26 the relay 56 is energized by the transformer 80 of the circuit running from the secondary 81 of the transformer over the two contacts of the armature 71 which are normally closed and over bus conductor 52 to the relay 56 and over conductor 67 and button 26 to the bus conductor 63 of the control box and over 61 and 51 back to secondary 81. Therefore relay 56 is energized closing the armatures 57 and 54. When armature 57 is closed a holding circuit is established which runs over conductor 51 back to the secondary 81 of the transformer without passing the push button 26 in the control box so that the latter may open again. The closing of the armature 54 connects the bus conductor 48 with the supply line 34 and lights lamp 90. The pressing of push button switch 22b energizes relay 42b, the circuit running from the bus conductor 52 connected with transformer secondary 81 over relay 42b and conductor 65b to the push button 22b and to the bus conductor 63, the strand 61 and bus conductor 51 back to the transformer secondary 81. The relay 42b when energized closes the armature 44 whereby a holding circuit by-passing button 22b to the return conductor 51 is closed. Simultaneously the armatures 47 and 49 are drawn towards their fixed contacts. However merely bus conductor 48 has been connected with the supply line 34 by the previous energization of relay 56 and therefore green lamp 33b is energized over conductor 36b and bus conductor 60.

The pressing of button 21e energizes relay 42e and its armature 44 thereby closes the holding circuit in the manner already described for relay 40b and connects the lamp group 31e, 30e by means of its armature 45, 46 with the bus conductors 48, 50. However, as merely the bus conductor 48 is connected with the source of supply at 34 only lamp 31e which is a green lamp will be lighted, the circuit running from conductor 34 over armature 54, bus conductor 48, armature 45 of relay 40e, conductor 38e, green lamp 31e and bus conductor 60 connected with the second supply line 35.

It will therefore be seen that the window 12 with the inscription "Green" and preferably illuminated by green light and the window 9b and 8e will be lighted by green lamps. The score can thus be read without any ambiguity on the display box.

The operator now presses button 27 of the control box in order to prepare the display box for the next announcement. When button 27 is pressed relay 70 is energized the circuit running from secondary 81 over relay 70, conductor 69, push button switch 27 to bus conductor 63 and over strand 61 to bus conductor 51 and to secondary 81 of the transformer 80.

The energization of relay 70 opens the contacts 71 and therefore opens all the holding circuits of the relays 56, 42b and 40e which have been energized. The armatures drop back and therefore also the connection of the green lamps 33d and 31e with the bus conductor 48 and the connection of the bus conductor 48 with the supply line 34 is cut. The display box therefore returns to its original position simultaneously with the energization of armature 71 armature 72 is energized and a chime is operated. Thereby those persons who have been following the game on the display apparatus are informed that a new score is to be announced.

It will be clear that the example described which is merely relative to two parties and to two displays may be changed to a plurality and that many other minor constructive adjustments may be made without departing from the principle of the invention.

Having described the invention, what is claimed as new is:

1. An annunciator for games played by a plurality of players comprising a display box provided with a plurality of rows of display windows, each row containing a plurality of display windows displaying predetermined indicia related to the score of the game, a plurality of alternatively operable illumination means of different types indicative of the players, associated with each of the display windows, all display windows being provided with illumination means of all types, further selection indicating display windows provided with illumination means indicative of the player with which the indicia displayed are associated, a control box for controlling the operation of the said illumination means, provided with a plurality of series of display control buttons, each series of buttons corresponding to a row of indicia displaying display windows and each display control button of a series controlling the illumination means of one of the indicia displaying display windows in the corresponding row, selection control buttons for controlling the illumination devices of the selection indicating display windows and means controlled by said selection control buttons for automatically operating a definite type of illuminating device in each display window upon subsequent operation of display control button of the control box.

2. An annunciator for games played by a plurality of players comprising a display box with a plurality of translucent display windows, each adapted to display predetermined indicia related to the score of the game, a plurality of alternatively operable illumination means of different distinguishable types for each of said display windows, adapted to display the indicia in a number of different manners indicative of the players, all the display windows being provided with illumination means of all indicative types, a source of current and operative circuits for said illumination means, display control relays, connecting the circuits of all illumination devices of a display window with feed lines, when operated, selector relays controlling the connection of the feed lines with the source of current, a control box for controlling the operation of the said illumination means, provided with a plurality of display control buttons, each display control button controlling the display control relay of a display window, selection control buttons for controlling the selector relays, said selector relays when energized selecting automatically the same type of illuminating device in each display window upon subsequent operation of any display control button.

3. An annunciator for games played by a plurality of players comprising a display box provided with a plurality of rows of display windows, each row containing a plurality of display windows displaying predetermined indicia related to the score of the game, a plurality of alternatively operable illumination means of different distinguishable types indicative of the players, associated with each of the display windows, all display windows being provided with illumination means of all types, further selection indicating display windows each provided with one type of illumination means for indicating the type of illuminating means being used in the indicia displaying display windows and therefore indicative of the player with which the indicia displayed are associated, a source of current and operative circuits for said illumination means, display control relays, each connecting the circuits of all illumination devices of a display window with feed lines, when operated, selector relays controlling the connection of the feed line with the source of current, and further controlling the illumination devices of the selection indicating display windows, a control box for controlling the operation of the said illumination means, provided with a plurality of series of display control buttons, each series of buttons corresponding to a row of indicia displaying display windows and each display control button of a series controlling the display control relay of a display window, and selection control buttons for controlling said selection relays.

4. An annunciator for games played by a plurality of players as claimed in claim 2 and comprising in addition, holding circuits for the display control and selection relays and a release relay for interrupting said holding circuits, an operative circuit for said release relay, a special release button in the control box for operating said release relay, an electromagnetically operated chime, an operative circuit for the same and means to close said circuit and to operate the chime upon operation of the release relay.

5. An annunciator for games played by a plurality of players comprising a display box with a plurality of display windows, each adapted to display predetermined indicia related to the score of the game, a plurality of means for displaying the predetermined indicia of each display window, each of said means producing a type of display of the predetermined indicia differing from the type of display produced by other means, a control box for controlling the operation of said display means, said control box being provided with selector control means, selecting the type of indicia displaying means to be used during one score indicating operation, and with display control means for operating the indicia display means in the display windows, the operation of the selector control means producing automatically a selection of the type of indicia display means to be operated upon an operation of the display control means of the control box following the operation of the selector control means.

6. An annunciator for a game being played by a plurality of players, comprising a display box, a plurality of display windows in said box, a plurality of signal devices in each of said display windows, a plurality of signal energizing circuits, each of said circuits being common to a signal in each of said windows, a controller for said display box including a switch board, a push button for each window of said display box, a relay actuated by each of said push buttons, each of said relays including contacts closing each of the signal circuits for the corresponding display window, a holding circuit for each relay, selector buttons, relays energized by said selector buttons selectively energizing said energizing circuits whereby actuation of a window relay will actuate pre-selected ones of said signal devices, a restoring button, actuation of said restoring button deactivating said relays.

7. An annunciator for a game played by a plurality of players, a signal panel, a plurality of display windows, a signal device in each window for each of said players, a signal circuit for each of said players, each of said signal circuits being connected to the corresponding signal in each window, a controller including a push button for each window, a relay for each push button, a holding circuit for each of said relays, an energizing circuit for said relays, each of said relays closing all of the signal circuits of the associated window, selector buttons, said selector buttons selectively energizing said signal circuits whereby actuating said relays energize preselected signal devices, a release button, a relay energized by said release button deenergizing said relay energizing circuit.

THOMAS J. DOHERTY.
MARION E. CURL.

REFERENCES CITED

The following references are of record in the file of this patent:

UNITED STATES PATENTS

| Number | Name | Date |
|---|---|---|
| 655,264 | Nichol | Aug. 7, 1900 |
| 1,000,039 | Redding | Aug. 8, 1911 |
| 1,539,366 | O'Brien | May 20, 1925 |
| 1,922,517 | Amory | Aug. 15, 1933 |
| 2,480,504 | Ott | Aug. 30, 1949 |

FOREIGN PATENTS

| Number | Country | Date |
|---|---|---|
| 338,849 | Great Britain | Nov. 18, 1930 |